(No Model.)
A. C. DOWNEY & A. H. GREEN.
HARROW.
No. 446,251. Patented Feb. 10, 1891.
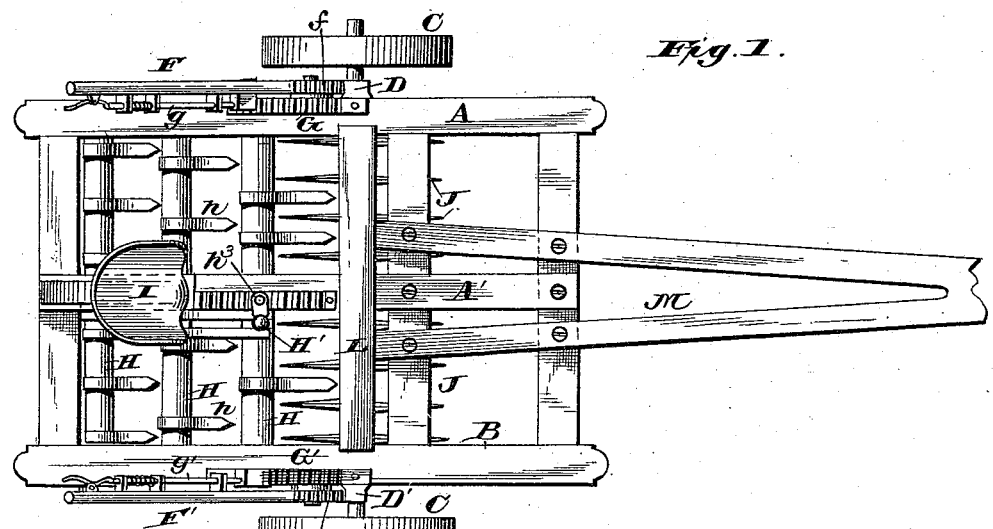
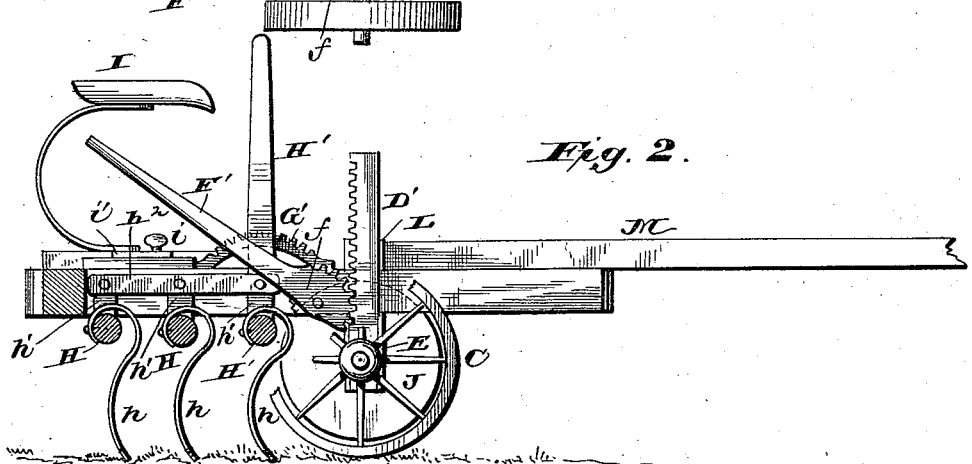
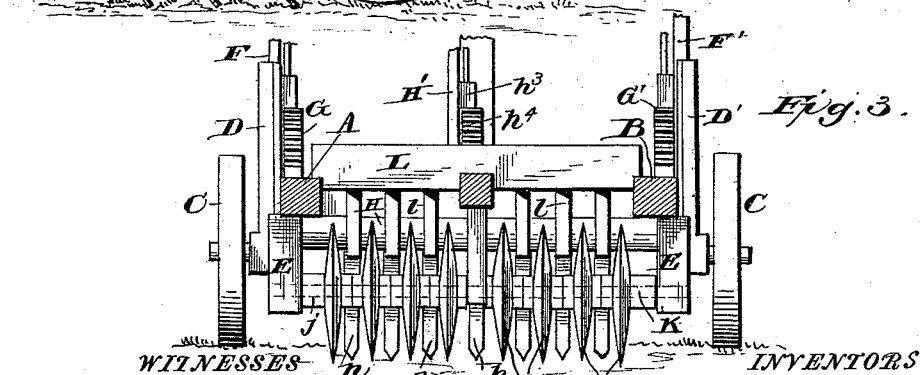
WITNESSES
F. L. Durand
Van Buren Hillyard
INVENTORS
Alvey C. Downey
Aleck H. Green
By R. Sz. H. Lacey
their Attorneys

United States Patent Office.

ALVEY C. DOWNEY AND ALECK H. GREEN, OF TOUSEY, KENTUCKY.

HARROW.

SPECIFICATION forming part of Letters Patent No. 446,251, dated February 10, 1891.

Application filed February 10, 1890. Serial No. 339,853. (No model.)

*To all whom it may concern:*

Be it known that we, ALVEY C. DOWNEY and ALECK H. GREEN, citizens of the United States, residing at Tousey, in the county of Grayson and State of Kentucky, have invented certain new and useful Improvements in Harrows; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to harrows, and aims to improve the general construction of this class of agricultural implements, whereby their efficiency will be increased and the draft lessened.

The improvement consists of the novel features which hereinafter will be more fully described and claimed, and which are shown in the annexed drawings, in which—

Figure 1 is a top plan view of a harrow embodying our invention. Fig. 2 is a vertical longitudinal section on the line X X of Fig. 1. Fig. 3 is a cross-section on the line Y Y of Fig. 1.

The frame comprises the side bars A, end bars B, and intermediate brace-bars A' and B', the former being parallel with the side bars, the latter with the end bars.

The wheels C, one for each side of the machine, are journaled on spindles that project from the sides of the independently-adjustable standards D and D', that work in ways in the hangers E, which depend from the side bars B. These standards D and D' have teeth on their inner edges, which mesh with the toothed segments $f$ on the levers F and F', respectively. The hand-latches $g$ and $g'$ engage with the toothed segments G and G' and hold the standards at the located position.

The pivoted tooth-bars H, provided with spring-teeth $h$, have vertical arms $h'$, which are connected together by bar $h^2$. One of the arms $h'$ is projected up to form the lever H', which is provided with the latch $h^3$, that is adapted to engage with the toothed segment $h^4$ and hold said lever and the tooth-bars H in the required position.

The seat I is adjustable on the bar A', being held in the desired position by the binding-screw $i$, which passes through block $i'$ and bears against the plate I' in which said block $i'$ slides, and which is secured to the said bars A'.

The cutting-disks J are mounted on the shaft K, which is supported at its ends in the hangers E and between its ends in the bracket E', and have lateral tubular extensions $j$, which space them apart the required distance. These cutting-disks have an independent rotary movement on the shaft K, and are designed to cut the trash, sod, clods, &c., and otherwise prepare the ground in advance of the harrow.

The cleaner for preventing the clogging of the cutting-disks comprises the bar L, which is secured to the side and intermediate bars A and A', and the fingers $l$, which depend from the bar L and extend between the said cutting-disks.

The machine is drawn over the field by the team, which is hitched to the tongue M, and is raised or lowered by operating the levers F and F'. Either side of the machine can be raised or lowered independently of the other by operating the proper lever F or F'. The harrow-teeth can be adjusted by operating the lever H'.

Having fully described our invention, what we claim, and desire to secure by Letters Patent, is—

The hereinbefore shown and described harrow, comprising the frame A A' B B', the hangers E E, having vertical ways, and having the cutting-disks mounted on a shaft which is journaled in the said hangers, a cleaner for removing the trash from between the cutting-disks, adjustable pivoted tooth-bars in the rear of the cutting-disks, the toothed standards D D', adapted to slide in the ways in the hangers E E and having spindles at their lower ends on which the supporting-wheels C C are mounted, and the toothed segment-levers F F' for vertically adjusting the standards D D' independently of each other, substantially as described.

In testimony whereof we affix our signatures in presence of two witnesses.

ALVEY C. DOWNEY.
ALECK H. GREEN.

Witnesses:
J. D. WILSON,
JAMES YOUNG.